United States Patent
Li et al.

(10) Patent No.: US 12,520,315 B2
(45) Date of Patent: Jan. 6, 2026

(54) MULTI-TTI SCHEDULING OF PDSCH AND PUSCH BY DCI

(71) Applicant: Intel Corporation, Santa Clara, CA (US)

(72) Inventors: Yingyang Li, Beijing (CN); Debdeep Chatterjee, San Jose, CA (US); Daewon Lee, Portland, OR (US); Yi Wang, Beijing (CN); Gang Xiong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 18/280,808

(22) PCT Filed: May 10, 2022

(86) PCT No.: PCT/US2022/028428
§ 371 (c)(1),
(2) Date: Sep. 7, 2023

(87) PCT Pub. No.: WO2022/240785
PCT Pub. Date: Nov. 17, 2022

(65) Prior Publication Data
US 2024/0114507 A1    Apr. 4, 2024

Related U.S. Application Data

(60) Provisional application No. 63/298,509, filed on Jan. 11, 2022, provisional application No. 63/186,708, filed on May 10, 2021.

(51) Int. Cl.
*H04W 72/1273* (2023.01)
*H04L 1/1829* (2023.01)
*H04W 72/232* (2023.01)

(52) U.S. Cl.
CPC ....... *H04W 72/1273* (2013.01); *H04L 1/1829* (2013.01); *H04W 72/232* (2023.01)

(58) Field of Classification Search
CPC ........... H04W 72/1273; H04W 72/232; H04W 72/23; H04W 72/0446; H04L 1/1829;
(Continued)

(56) References Cited

U.S. PATENT DOCUMENTS 12,309,794 B2 * 5/2025 Lee .................. H04W 72/23
2022/0061081 A1 * 2/2022 Jung ................. H04L 1/1896
(Continued)

FOREIGN PATENT DOCUMENTS

EP    3787362 A1    3/2021
JP    2024518224    5/2024
(Continued)

OTHER PUBLICATIONS

"Japanese Application Serial No. 2023-553942, Response filed Dec. 20, 2024 to Notification of Reasons for Refusal mailed Oct. 29, 2024", w English claims, 17 pgs.
(Continued)

*Primary Examiner* — Rasheed Gidado
(74) *Attorney, Agent, or Firm* — Schwegman Lundberg & Woessner, P.A.

(57) ABSTRACT

A user equipment (UE) configured for operation in a fifth-generation new radio (5G NR) system may be configured for multi physical downlink shared channel (PDSCH) scheduling and may decode a first downlink control information (DCI) and a second DCI received from a gNodeB (gNB). The first DCI may schedule multiple PDSCHs and the second DCI may schedule one or more PDSCHs. The UE may check the timing relations of the scheduled PDSCHs for validity when the first DCI and the second DCI end at a same symbol. When the multiple PDSCHs scheduled by the first
(Continued)

DCI and the one or more PDSCHs scheduled by the second DCI are determined to have overlapping time spans, the UE may identify all the PDSCHs scheduled by the first DCI the second DCI as invalid.

20 Claims, 7 Drawing Sheets

(58) Field of Classification Search
CPC ... H04L 1/1812; H04L 1/1822; H04L 1/1896; H04L 5/001; H04L 5/0044; H04L 5/0055
See application file for complete search history.

(56) References Cited

U.S. PATENT DOCUMENTS

| | | | |
|---|---|---|---|
| 2022/0123906 A1* | 4/2022 | Wu | H04L 1/1854 |
| 2022/0149996 A1* | 5/2022 | Moon | H04L 5/0055 |
| 2022/0322314 A1* | 10/2022 | Rastegardoost | H04W 72/23 |

FOREIGN PATENT DOCUMENTS

| | | |
|---|---|---|
| WO | WO-2020013558 A1 | 1/2020 |
| WO | WO-2022240785 A1 | 11/2022 |

OTHER PUBLICATIONS

"International Application Serial No. PCT/US2022/028428, International Search Report mailed Aug. 23, 2022", 3 pgs.
"International Application Serial No. PCT/US2022/028428, Written Opinion mailed Aug. 23, 2022", 4 pgs.
Lenovo, et al., "Enhancements on Multi-TRP for PDCCH, PUCCH and PUSCH", R1-2100274, 3GPP TSG RAN WG1 #104-e, e-Meeting,, (Jan. 18, 2021), 17 pgs.
Qualcomm, Incorporated, "PDSCH and PUSCH enhancements for 52.6-71GHz band", R1-2103161, 3GPP TSG-RAN WG1 #104-bis-e, e-Meeting, (Apr. 7, 2021), 19 pgs.
Sony, "PDSCH/PUSCH enhancements for NR from 52.6 GHz to 71 GHz", R1-2103298, 3GPP TSG RAN WG1 #104bis-e, e-Meeting, (Apr. 7, 2021), 8 pgs.
"U.S. Appl. No. 18/280,808, Preliminary Amendment filed Sep. 7, 2023", 9 Pages.
"U.S. Appl. No. 18/280,808, Supplementary Preliminary Amendment filed Sep. 26, 2023", 9 pages.
"International Application Serial No. PCT US2022 028428, International Preliminary Report on Patentability mailed Nov. 23, 2023", 6 pgs.
"Japanese Application Serial No. 2023-553942, Voluntary Amendment filed Nov. 30, 2023", w English claims, 15 pgs.
"Japanese Application Serial No. 2023-553942, Notification of Reasons for Refusal mailed Oct. 29, 2024", w English Translation, 7 pgs.

* cited by examiner

MULTI-TTI SCHEDULING OF PDSCH AND PUSCH BY DCI

PRIORITY CLAIMS

This application is a U.S. National Stage Filing under 35 U.S.C. 371 from International Application No. PCT/US2022/028428, filed May 10, 2022 and published in English as WO 2022/240785 on Nov. 17, 2022, which claims priority to U.S. Provisional Patent Application Ser. No. 63/186,708, filed May 10, 2022 [reference number AD6517-Z], and U.S. Provisional Patent Application Ser. No. 63/298,509, filed Jan. 11, 2022 [reference number AE1402-Z], which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with 5G NR wireless systems is that a Downlink Control Information (DCI) format may be able to schedule one or more Physical Downlink Shared Channels (PDSCHs) or Physical Uplink Shared Channels (PUSCHs) with separate transport blocks (TB s).

DETAILED DESCRIPTION

Figure 1A:
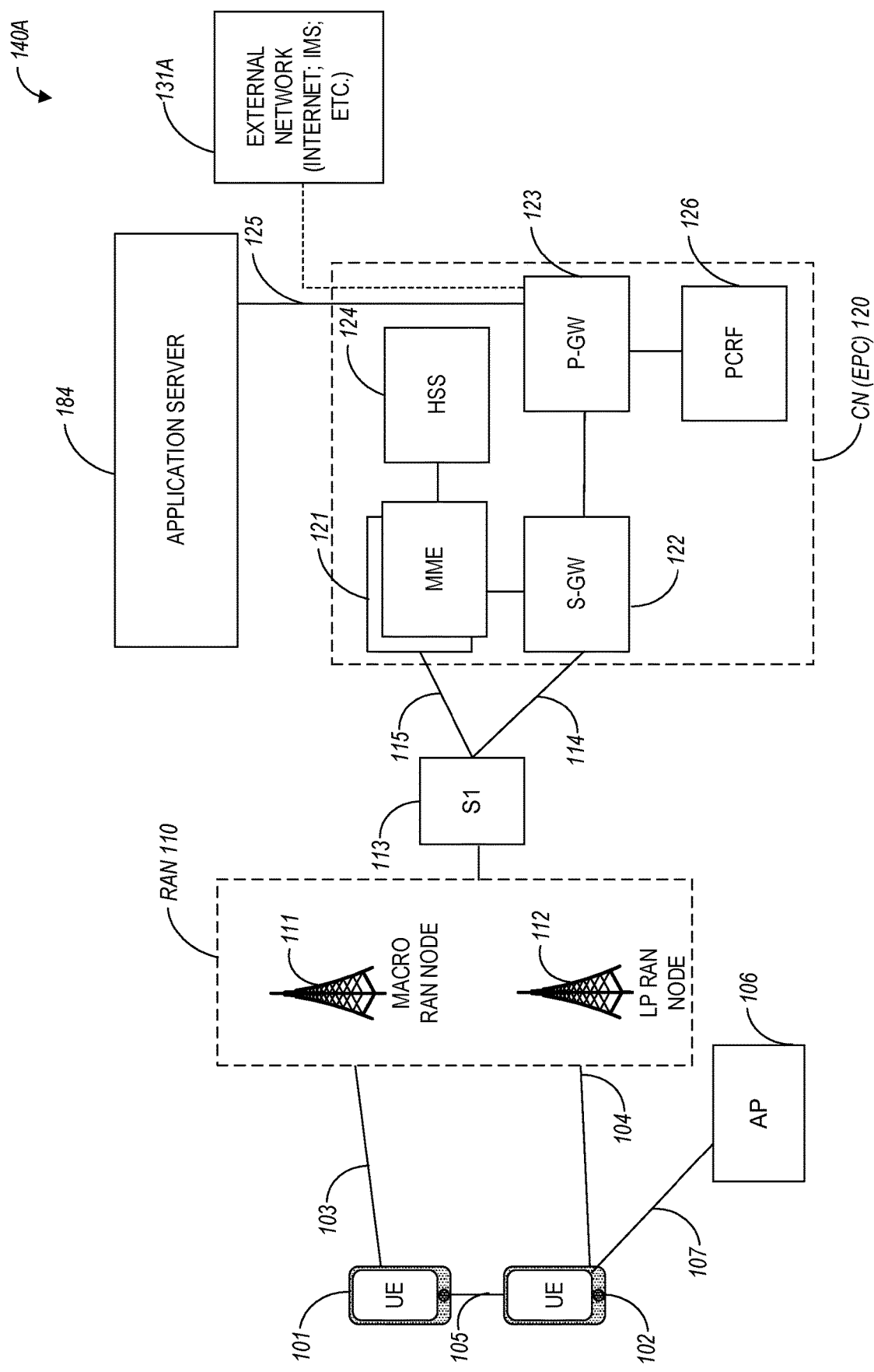
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to multi transmission time interval (multi-TTI) scheduling. Some embodiments are directed to checking timing for shared channels that are scheduled by downlink control information (DCI) formats ending at the same symbol.

Some embodiments are directed to a user equipment (UE) configured for operation in a fifth-generation new radio (5G NR) system. In these embodiments, when the UE is configured for multi physical downlink shared channel (PDSCH) scheduling, the UE may be configured to decode a first downlink control information (DCI) (DCI 1) and a second DCI (DCI 2) received from a gNodeB (gNB). The first DCI may schedule multiple PDSCHs and the second DCI may schedule one or more PDSCHs. The UE may check the timing relations of the scheduled PDSCHs for validity when the first DCI and the second DCI end at a same symbol. The UE may include memory to store the first and second DCIs. In some embodiments, multiple PDSCHs, each with different transport blocks (TBs), may be scheduled, although the scope of the embodiments is not limited in this respect. These embodiments are discussed in more detail below.

In some embodiments, when the first DCI and the second DCI end at the same symbol, the UE may check the timing relations of the scheduled PDSCHs for validity by determining whether the multiple PDSCHs scheduled by the first DCI and the one or more PDSCH scheduled by the second DCI have overlapping time spans. In these embodiments, since the first DCI and the second DCI end at the same symbol, the UE knows the contents of the DCIs at the simultaneously. Although many of the embodiments disclosed herein relate to scheduling PDSCHs, the scope of the embodiments is not limited in this respect as they may also apply to the scheduling of physical uplink shared channels (PUSCHs).

In some embodiments, when the first DCI and the second DCI end at the same symbol and when the multiple PDSCHs scheduled by the first DCI and the one or more PDSCH scheduled by the second DCI are determined to have non-overlapping time spans, the UE may identify some or all of the PDSCHs scheduled by the first DCI the second DCI as valid and may attempt to decode the scheduled PDSCHs, although the scope of the embodiments is not limited in this respect.

In some embodiments, when the first DCI and the second DCI end at the same symbol and when the multiple PDSCHs scheduled by the first DCI and the one or more PDSCHs scheduled by the second DCI are determined to have overlapping time spans, the UE may identify all the PDSCHs scheduled by the first DCI the second DCI as invalid and may refrain from attempting to decode or decoding any of the scheduled PDSCH, although the scope of the embodiments is not limited in this respect. In some of these embodiments, when the first DCI and the second DCI end at the same symbol and when the multiple PDSCHs scheduled by the first DCI and the one or more PDSCH scheduled by the second DCI are determined to have overlapping time spans, the behavior of the UE is not limited or defined (i.e., an error case in which implementation is not defined. In these embodiments, when the first DCI and the second DCI end at the same symbol, the UE may be configured to check all possible combinations of scheduled PDSCHs for validity and if any combination is invalid, all combinations may be deemed invalid, although the scope of the embodiments is not limited in this respect.

In some embodiments, when the first DCI and the second DCI do not end at the same symbol, the multiple PDSCHs scheduled by the first DCI are scheduled by the gNB to have non-overlapping time spans with the one or more PDSCHs scheduled by the second DCI. In these embodiments, when the first DCI and the second DCI do not end at the same symbol, the multiple PDSCHs scheduled by the first DCI are assumed by the UE to have non-overlapping time spans with the PDSCH scheduled by the second DCI. Accordingly, the UE does not need to check the scheduled PDSCHs for validity. In these embodiments, when the first DCI and the second DCI do not end at the same symbol, the UE does not expect that the scheduled PDSCH(s) by the two DCIs have overlapping time spans, where the time span associated with a DCI is defined from the beginning of the first scheduled PDSCH or up to the end of the last scheduled PDSCH. Accordingly, the UE does not need to check the timing relations of the scheduled PDSCHs for validity, although the scope of the embodiments is not limited in this respect.

In some embodiments, when the first DCI and the second DCI do not end at the same symbol, the UE may refrain from checking the timing relations of the scheduled PDSCHs for validity. In these embodiments, when the first DCI and the second DCI do not end at the same symbol and when the first DCI ends before the second DCI ends, the start of a first PDSCH of the one or more PDSCHs scheduled by the second DCI is not expected to be earlier than the end of a last PDSCH of the multiple PDSCHs scheduled by the first DCI. In these embodiments, when the first DCI and the second DCI do not end at the same symbol and when the first DCI ends before the second DCI ends, the end of a last PDSCH of the multiple PDSCHs scheduled by the first DCI is expected to be earlier than a beginning of a first PDSCH of the he one or more PDSCHs scheduled by the second DCI, although the scope of the embodiments is not limited in this respect.

In some embodiments, when the first DCI and the second DCI are received in a same time slot but do not end at the same symbol, the UE may not need to check the timing relations of the scheduled PDSCHs for validity, although the scope of the embodiments is not limited in this respect.

Figures 3A, 3B, 3C, 3D, 3E, 3F, 3G:
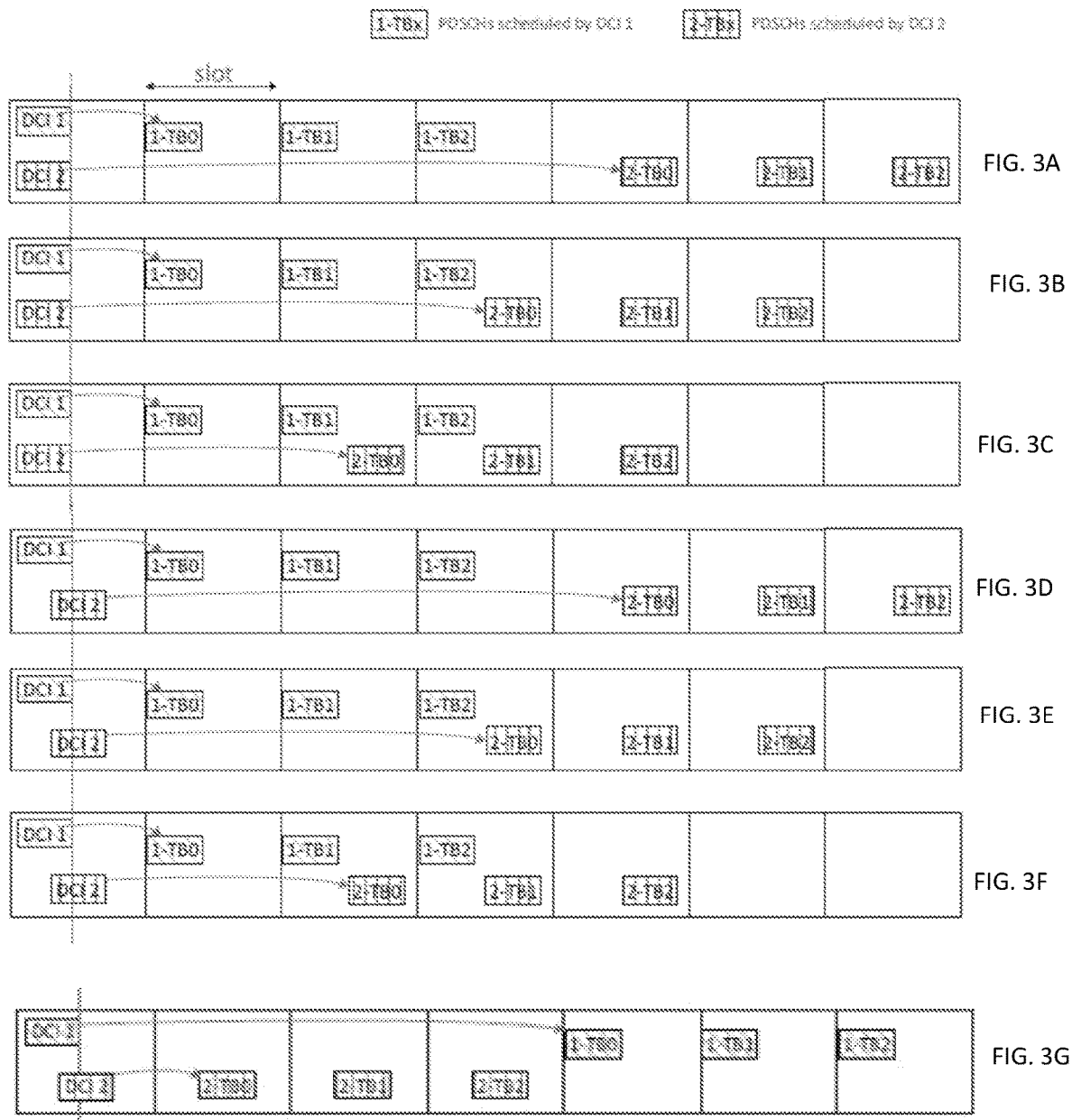
FIGS. 3A-3G illustrate timing relations between PDCCHs and the scheduled PDSCHs, in accordance with some embodiments.

In some alternate embodiments, when the first DCI and the second DCI do not end at the same symbol and when the first DCI ends at a symbol prior to the second DCI, the UE may check the timing relations of the scheduled PDSCHs for validity by determining whether the multiple PDSCHs scheduled by the first DCI end prior to the one or more PDSCH scheduled by the second DCI. In these alternate embodiments, the PDSCHs scheduled by the first DCI must end before the PDSCH(s) scheduled by the second DCI to be considered valid scheduling, although the scope of the embodiments is not limited in this respect. An example of this invalid scheduling is illustrated in FIG. 3G.

In some embodiments, a first time span associated with the first DCI begins at a first symbol of a first PDSCH scheduled by the first DCI and extends up to a last symbol of a last PDSCH scheduled by the first DCI. In these embodiments, a second time span associated with the second DCI begins at a first symbol of a first PDSCH scheduled by the second DCI and extends up to a last symbol of a last PDSCH scheduled by the second DCI. In these embodiments, the UE may use a configured time domain resource allocation (TDRA) table to determine a location (i.e., which symbols and slots) of the scheduled PDSCHs. In these embodiments, a time span of PDSCHs associated with a DCI begins at a first symbol of first scheduled PDSCH and extends up to a last symbol of an end of a last scheduled PDSCH, although the scope of the embodiments is not limited in this respect.

In some embodiments, for the multi-PDSCH or multi-PUSCH scheduling when each of the multiple PDSCHs or PUSCHs scheduled by the first DCI comprise a different transport block (TB), each scheduled PDSCH or PUSCH may be associated with a different hybrid automatic repeat request (HARQ) process identifier (ID) for a serving cell. In these embodiments, when each of the one or more PDSCHs or PUSCHs scheduled by the second DCI comprise a different TB, each scheduled PDSCH or PUSCH is associated with a different HARQ process ID for the serving cell. In these embodiments, the UE may encode HARQ feedback for transmission to the gNB for each of the different HARQ process IDs. In these embodiments, a multi-PDSCH may be scheduled by the first DCI and a multi PDSCH may be scheduled by the second DCI, although the scope of the embodiments is not limited in this respect.

In some embodiments, when each of the multiple PDSCHs or PUSCHs scheduled by the first DCI comprise a different transport block (TB), each scheduled PDSCH or PUSCH may be associated with a different HARQ process ID for a serving cell. In these embodiments, for PUSCH repetition type A or B when each of the one or more PDSCHs or PUSCHs scheduled by the second DCI comprise repetitions of a same TB, the one or more PDSCHs or PUSCHs scheduled by the second DCI are all associated with a second same single HARQ process ID for the serving cell. In these embodiments, the UE may encode HARQ feedback for transmission to the gNB for each of the different HARQ process IDs. In these embodiments, a multi-PDSCH may be scheduled by the first DCI and a multi-slot PDSCH may be scheduled by the second DCI, although the scope of the embodiments is not limited in this respect.

In some embodiments, for the multi-PDSCH or multi-PUSCH scheduling when each of the multiple PDSCHs or PUSCHs scheduled by the first DCI comprise a different transport block (TB), each scheduled PDSCH or PUSCH may be associated with a different HARQ process ID for a serving cell. In these embodiments, when the second DCI schedules a single PDSCH or PUSCH comprising a single TB, the single PDSCH or PUSCH may be associated with a second single HARQ process ID for the serving cell. In these embodiments, the UE may encode HARQ feedback for transmission to the gNB for each of the different HARQ process IDs. In these embodiments, a multi-PDSCH may be scheduled by the first DCI and a multi PDSCH may be scheduled by the second DCI, although the scope of the embodiments is not limited in this respect.

Some embodiments are directed to a non-transitory computer-readable storage medium that stores instructions for execution by processing circuitry of a user equipment (UE) configured for operation in a fifth-generation new radio (5G NR) system. In these embodiments, when the UE is configured for multi physical downlink shared channel (PDSCH) scheduling, the processing circuitry configured to decode a first downlink control information (DCI) (DCI 1) and a second DCI (DCI 2) received from a gNodeB (gNB). The first DCI may schedule multiple PDSCHs and the second DCI may schedule one or more PDSCHs. In these embodiments, the processing circuitry may check timing relations of the scheduled PDSCHs for validity when the first DCI and the second DCI end at a same symbol. In some embodiments, the processing circuitry comprises a baseband processor. These embodiments are described in more detail below.

Some embodiments are directed to a gNodeB (gNB) configured for operation in a fifth-generation new radio (5G NR) system. In these embodiments, for a user equipment (UE) configured for multi physical downlink shared channel (PDSCH) scheduling, the gNB may encode a first downlink control information (DCI) (DCI 1) and a second DCI (DCI 2) for transmission to the UE. The first DCI may schedule multiple PDSCHs and the second DCI may schedule one or more PDSCHs. In these embodiments, when the first DCI and the second DCI end at a same symbol, the UE is configured to check timing relations of the scheduled PDSCHs for validity. When the multiple PDSCHs scheduled by the first DCI and the one or more PDSCH scheduled by the second DCI have overlapping time spans, the gNB is not expected to receive hybrid automatic repeat request acknowledge (HARQ-ACK) feedback from the UE for the scheduled PDSCHs because the UE may have determined that the scheduled PDSCHs are invalid, although the scope of the embodiments is not limited in this respect. These embodiments are described in more detail below.

In some embodiments, when the first DCI and the second DCI end at the same symbol and when the multiple PDSCHs scheduled by the first DCI and the one or more PDSCH scheduled by the second DCI have non-overlapping time spans, the gNB may decode HARQ-ACK feedback from the UE for the scheduled PDSCHs that are decoded by the UE, although the scope of the embodiments is not limited in this respect.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
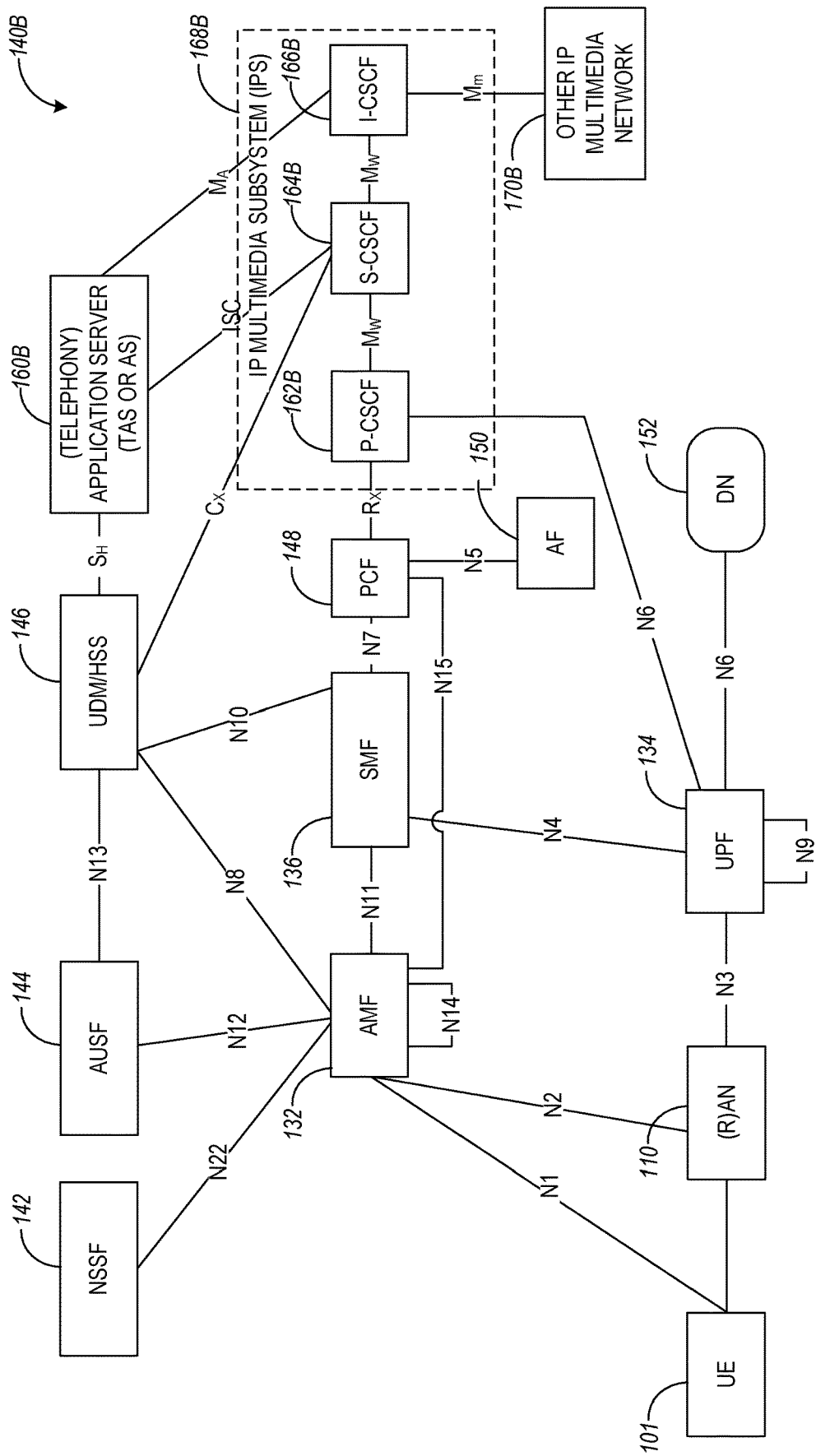
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
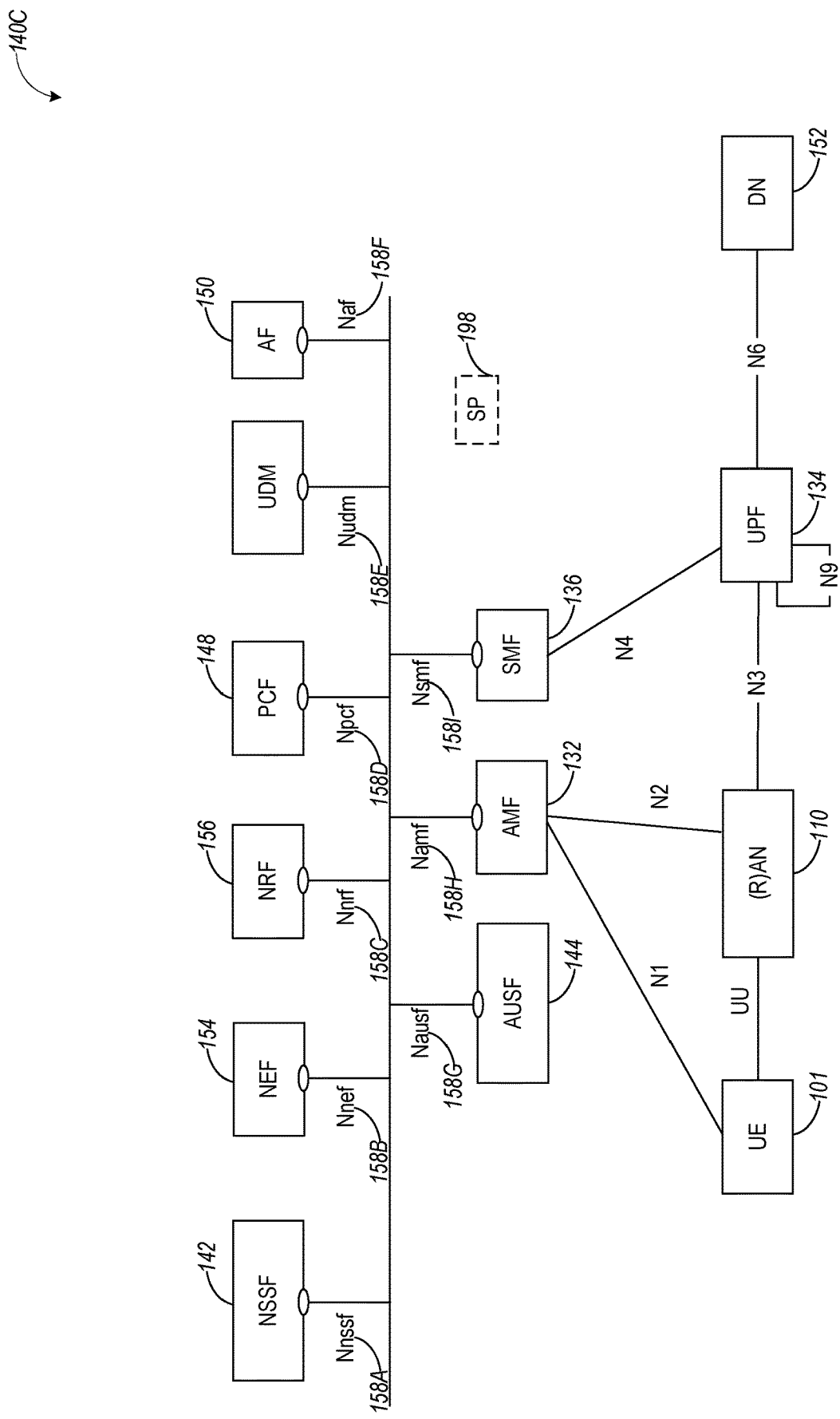

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 1D:
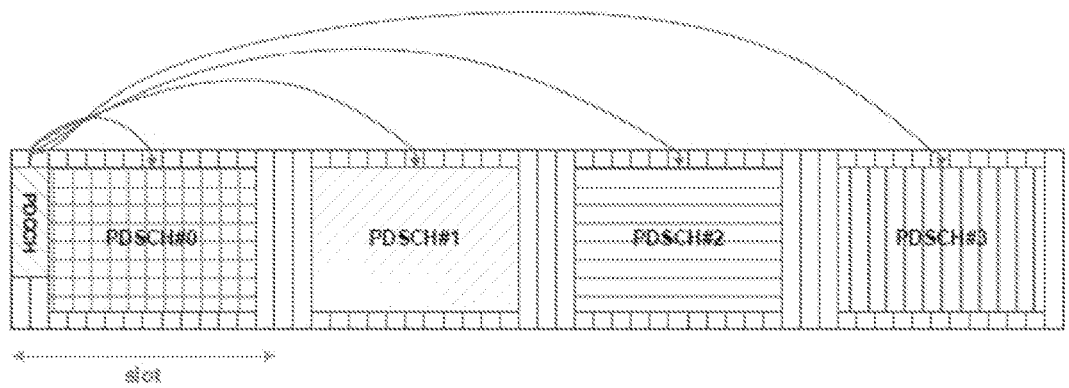
FIG. 1D illustrates multi-transmission time interval (TTI) scheduling for physical downlink shared channels (PDSCHs).

For a system operating above 52.6 GHz carrier frequency, the subcarrier spacing, is increased and the slot duration is reduced. A DCI may schedule PDSCH transmissions with one or multiple transport blocks (TBs). FIG. 1D illustrates one example of multi-PDSCH scheduling. In the example, 4

PDSCHs (PDSCH #0-3) with different transport blocks (TB) are scheduled by a single DCI.

In NR, out-of-order between the PDCCHs and the scheduled PDSCHs/PUSCHs are considered invalid. For any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. For any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i. Further, for PDSCH/PUSCH with repetition, it is clarified that the UE is not expected to be scheduled to receive more than one unicast PDSCH per slot per serving cell. The similar rules may apply to the multi-PDSCH and/or multi-PUSCH scheduling. Various embodiments herein provide techniques for multi-PDSCH and/or multi-PUSCH scheduling.

Various embodiments herein provide techniques to schedule one or multiple PDSCHs or PUSCHs by a DCI for multi-TTI scheduling in system operating above 52.6 GHz carrier frequency. The timing relations of the PDCCHs and the scheduled PDSCHs should satisfy certain constraints.

A DCI format may be able to schedule one or more PDSCHs or PUSCHs with separate TBs. For example, the number of scheduled PDSCHs or PUSCHs for a row in a time domain resource allocation (TDRA) table equals to the number of configured SLIVs of the row. For a row of TDRA table, each SLIV can be configured in a different slot. Alternatively, one or more SLIVs may be configured in the same slot. A DCI format for multi-PUSCH scheduling may dynamically switching between the of scheduling single PDSCHs or PUSCHs and the scheduling of multiple PDSCHs or PUSCHs.

In one embodiment, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH. For any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH.

Figure 2A:
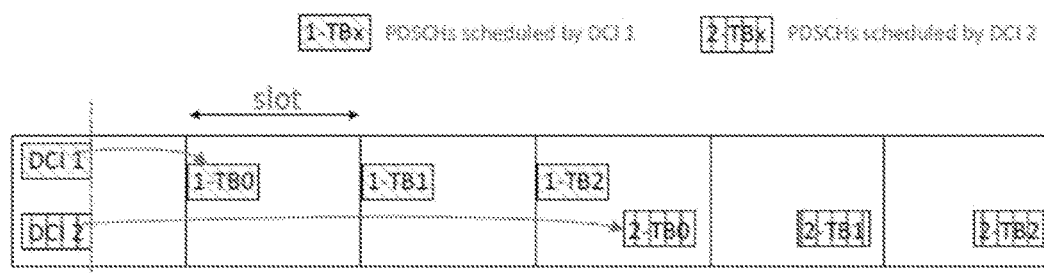
FIGS. 2A-2E illustrate timing relations between physical downlink control channels (PDCCHs) and the scheduled PDSCHs, in accordance with some embodiments.
Figure 2B:
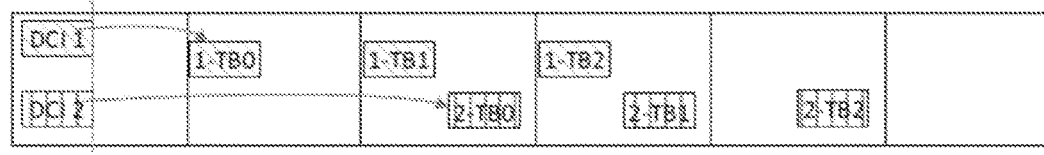
Figure 2C:
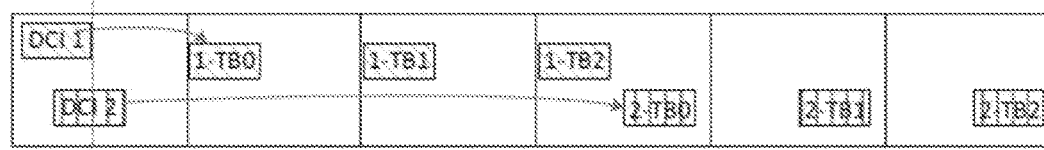
Figure 2D:
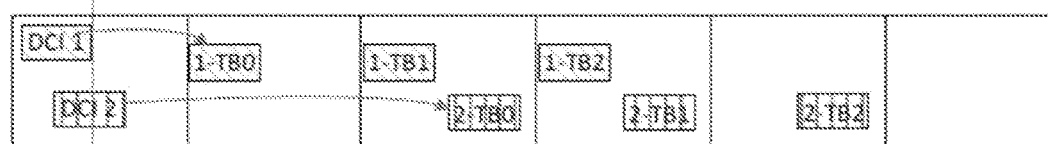

FIGS. 2A-2D illustrate some examples for the multi-PDSCH scheduling by two PDCCHs. The two PDCCHs end in same timing in FIG. 2A and FIG. 2B. PDCCH 2 ends later than PDCCH 1 in FIG. 2C and FIG. 2D. PDCCH 2 ends earlier than PDCCH 1 in FIG. 2E. Based on the principle in this embodiment, FIG. 2A, FIG. 2B and FIG. 2C are valid scheduling. On the other hand, FIG. 2D and FIG. 2E are invalid scheduling.

In one embodiment, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends not earlier than symbol i, starts earlier than the end of the last PDSCH that is scheduled by the first PDCCH. For any two or more HARQ process IDs in a given scheduled cell, if one or multiple PUSCHs are scheduled by a first PDCCH ending in symbol i, the UE is not expected that, a first PUSCH, that is scheduled with a second PDCCH that ends not earlier than symbol i, starts earlier than the end of the last PUSCH that is scheduled by the first PDCCH.

In this embodiment, the first PDCCH refers to the PDCCH that ends earlier than the other PDCCH. If the two PDCCHs end in same timing, the first PDCCH refers to the PDCCH that schedules a first PDSCH that starts earlier than the PDSCH(s) scheduled by the other PDCCH.

Figure 2E:
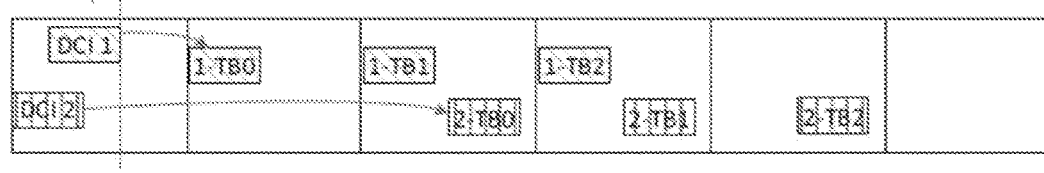

For the cases shown in FIGS. 2A-2E, based on the principle in this embodiment, FIG. 2A and FIG. 2C are valid scheduling. On the other hand, FIG. 2B, FIG. 2D and FIG. 2E are invalid scheduling.

In one embodiment, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH. Further, if the two PDCCHs end in the same symbol, the UE is not expected that, a first PDSCH, that is scheduled with the second PDCCH, starts earlier than the end of the last PDSCH that is scheduled by the first PDCCH, if the first PDSCH, that is scheduled with the first PDCCH, starts earlier than the start of the first PDSCH that is scheduled by the second PDCCH.

For any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH. Further, if the two PDCCHs end in the same symbol, the UE is not expected that, a first PUSCH, that is scheduled with the second PDCCH, starts earlier than the end of the last PUSCH that is scheduled by the first PDCCH, if the first PUSCH, that is scheduled with the first PDCCH, starts earlier than the start of the first PUSCH that is scheduled by the second PDCCH.

In this embodiment, the first PDCCH refers the PDCCH that ends earlier than the other PDCCH. If the two PDCCHs end in same timing, the first PDCCH refers to the PDCCH that schedules a first PDSCH that starts earlier than the PDSCH(s) scheduled by the other PDCCH. For the examples shown in FIGS. 2A-2E, based on the principle in this embodiment, FIG. 2A and FIG. 2C are valid scheduling. On the other hand, FIG. 2B, FIG. 2D and FIG. 2E are invalid scheduling.

In one embodiment, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH. Further, if the two PDCCHs end in the same symbol, the UE is not expected that, a first PDSCH, that is scheduled with the second PDCCH, starts earlier than the end of the last PDSCH that is scheduled by the first PDCCH, if a first PDSCH, that is scheduled with the first PDCCH, starts earlier than the end of the last PDSCH that is scheduled by the second PDCCH.

For any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH. Further, if the two PDCCHs end in the same symbol, the UE is not expected that, a first PUSCH, that is scheduled with the second PDCCH, starts earlier than the end of the last PUSCH that is scheduled by the first PDCCH, if a first PUSCH, that is scheduled with the first PDCCH, starts earlier than the end of the last PUSCH that is scheduled by the second PDCCH. In this embodiment, the first PDCCH can be either one of the two PDCCH. In other words, the first PDCCH is not necessarily ending earlier than the second PDCCH.

For the examples shown in FIGS. 2A-2E, based on the principle in this embodiment, FIG. 2A and FIG. 2C are valid scheduling. On the other hand, FIG. 2B, FIG. 2D and FIG. 2E are invalid scheduling.

In one embodiment, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the first PDSCH that is scheduled by the first PDCCH. For any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the first PUSCH that is scheduled by the first PDCCH.

In this embodiment, if the first PDSCHs respectively scheduled by two DCIs do not violate the principle, all PDSCHs scheduled by the two DCIs are considered valid. If the first PUSCHs respectively scheduled by two DCIs do not violate the principle, all PUSCHs scheduled by the two DCIs are considered valid. For the examples shown in FIGS. 2A-2E, 2, based on the principle in this embodiment, FIG. 2A, FIG. 2B, FIG. 2C and FIG. 2D are valid scheduling. On the other hand, FIG. 2E is invalid scheduling.

In one embodiment, in a given scheduled cell, UE is not expected to be scheduled to receive more than one unicast PDSCH in a slot. Further, for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH.

In a given scheduled cell, UE is not expected to be scheduled to receive more than one unicast PUSCH in a slot. Further, for any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH.

FIGS. 3A-3F illustrate examples for the multi-PDSCH scheduling by two PDCCHs. The two PDCCHs end in same timing in FIG. 3A, FIG. 3B and FIG. 3C. PDCCH 2 ends later than PDCCH 1 in FIG. 3D, FIG. 3E and FIG. 3F. Based on the principle in this embodiment, FIG. 3A and FIG. 3D are valid scheduling. On the other hand, FIG. 3B, FIG. 3C, FIG. 3E and FIG. 3F are invalid scheduling since 2 PDSCHs are scheduled in the same slot by the two PDCCHs.

In the above described embodiments, the principle for checking timing relations of the PDCCHs and the scheduled PDSCHs only applies to the case that both the two DCIs are scheduling multiple PDSCHs. Alternatively, the principle only applies to the case that at least one of the two DCIs is scheduling multiple PDSCHs when both the two DCIs use DCI format for multi-PDSCH scheduling. Alternatively, the principle only applies to the case that at least one of the two DCIs is scheduling multiple PDSCHs. Alternatively, the principle only applies to the case that both the two DCIs use DCI format for multi-PDSCH scheduling. Alternatively, the principle applies to any two DCIs for PDSCH scheduling.

In the above described embodiments, the principle checking timing relations of the PDCCHs and the scheduled PUSCHs only applies to the case that both the two DCIs are scheduling multiple PUSCHs. Alternatively, the principle only applies to the case that at least one of the two DCIs is scheduling multiple PUSCHs when both the two DCIs use DCI format for multi-PUSCH scheduling. Alternatively, the principle only applies to the case that at least one of the two DCIs is scheduling multiple PUSCHs. Alternatively, the principle only applies to the case that both the two DCIs use DCI format for multi-PUSCH scheduling. Alternatively, the principle applies to any two DCIs for PUSCH scheduling.

In one embodiment, for any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. In a given scheduled cell, if the UE is scheduled to receive multiple PDSCHs, with the first PDSCH starting in symbol j and the last PDSCH ending in symbol k, by a first PDCCH ending in symbol i, the UE is not expected to be scheduled to receive a PDSCH starting no earlier than symbol j and no later than symbol k with a second PDCCH.

Except for the case when a UE is configured by higher layer parameter PDCCH-Config that contains two different values of coresetPoolIndex in ControlResourceSet for the active BWP of a serving cell and PDCCHs that schedule two non-overlapping in time domain PUSCHs are associated to different ControlResourceSets having different values of coresetPoolIndex, for any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i.

in a given scheduled cell, if the UE is scheduled to transmit multiple PUSCHs, with the first PUSCH starting in symbol j and the last PUSCH ending in symbol k, by a first PDCCH ending in symbol i, the UE is not expected to be scheduled to transmit a PUSCH starting no earlier than symbol j and no later than symbol k with a second PDCCH.

UE may support to be scheduled to more than one unicast PDSCH or PUSCH in a slot in a given scheduled cell. For the examples shown in FIGS. 2A-2E, FIG. 2A and FIG. 2C are valid scheduling. On the other hand, FIG. 2B, FIG. 2D and FIG. 2E are invalid scheduling.

UE may not expect to be scheduled to receive more than one unicast PDSCH in a slot in a given scheduled cell. For the examples shown in FIGS. 3A-3F, FIG. 3A and FIG. 3D are valid scheduling. On the other hand, FIGS. 3B, 3C, 3E and 3F are invalid scheduling.

Figure 4A:
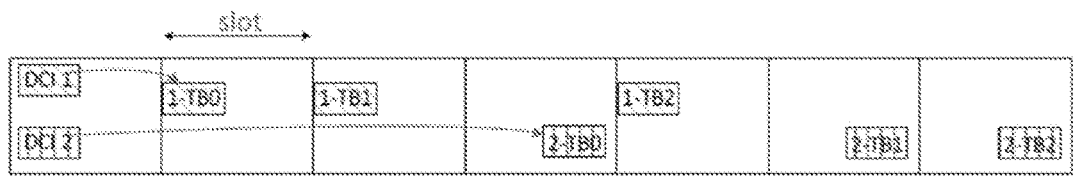
FIGS. 4A-4D further illustrate timing relations between PDCCHs and the scheduled PDSCHs, in accordance with some embodiments.
Figure 4B:
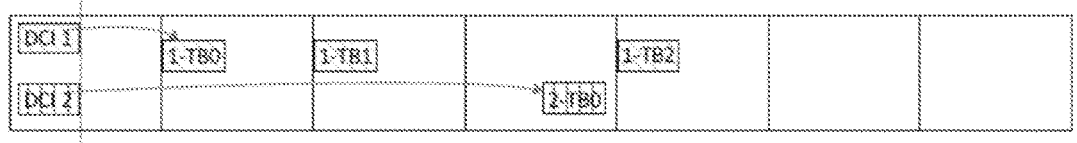
Figure 4C:
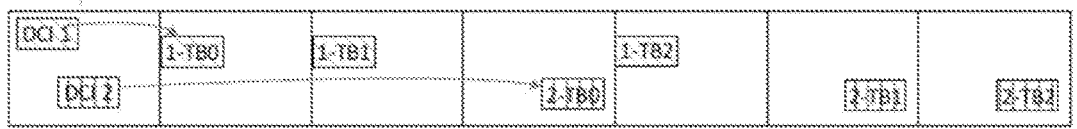
Figure 4D:

FIGS. 4A-4D illustrate additional examples on the relative timing between the two PDCCHs and its scheduled PDSCH(s). These examples assume that the multiple PDSCHs scheduled by a DCI may not be in consecutive slots. In FIG. 4A and FIG. 4C, the two PDCCHs end in same timing. Further, each PDCCH schedules multiple PDSCHs/PUSCHs in FIG. 4A and FIG. 4C. On the other hand, in FIG. 4B and FIG. 4D, one PDCCH schedules multiple PDSCHs while the other PDCCH only schedules single PDSCH. FIG. 4A, FIG. 4B, FIG. 4C and FIG. 4D are invalid scheduling based the embodiment.

In one embodiment, For any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. For any two or more HARQ process IDs in a given scheduled cell, if the UE is scheduled to receive multiple PDSCHs, with the first PDSCH starting in symbol j and the last PDSCH ending in symbol k, by a PDCCH ending in symbol i, the UE is not expected to be scheduled to receive a PDSCH starting no earlier than symbol j and no later than symbol k with another PDCCH that ends in symbol i.

Except for the case when a UE is configured by higher layer parameter PDCCH-Config that contains two different values of coresetPoolIndex in ControlResourceSet for the active BWP of a serving cell and PDCCHs that schedule two non-overlapping in time domain PUSCHs are associated to different ControlResourceSets having different values of coresetPoolIndex, for any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i.

for any two or more HARQ process IDs in a given scheduled cell, if the UE is scheduled to transmit multiple PUSCHs, with the first PUSCH starting in symbol j and the last PUSCH ending in symbol k, by a PDCCH ending in symbol i, the UE is not expected to be scheduled to transmit a PUSCH starting no earlier than symbol j and no later than symbol k with another PDCCH that ends in symbol i.

UE may support to be scheduled to more than one unicast PDSCH or PUSCH in a slot in a given scheduled cell. For the examples shown in FIGS. 2A-2E, FIG. 2A and FIG. 2C are valid scheduling. On the other hand, FIG. 2B, FIG. 2D and FIG. 2E are invalid scheduling.

UE may not expect to be scheduled to receive more than one unicast PDSCH in a slot in a given scheduled cell. For the examples shown in FIGS. 3A-3F, FIG. 3A and FIG. 3D are valid scheduling. On the other hand, FIG. 3B, FIG. 3C, FIG. 3E and FIG. 3F are invalid scheduling. For the examples shown in FIGS. 4A-4D, FIG. 4A, FIG. 4B, FIG. 4C and FIG. 4D are all invalid scheduling based the embodiment.

Figure 5:
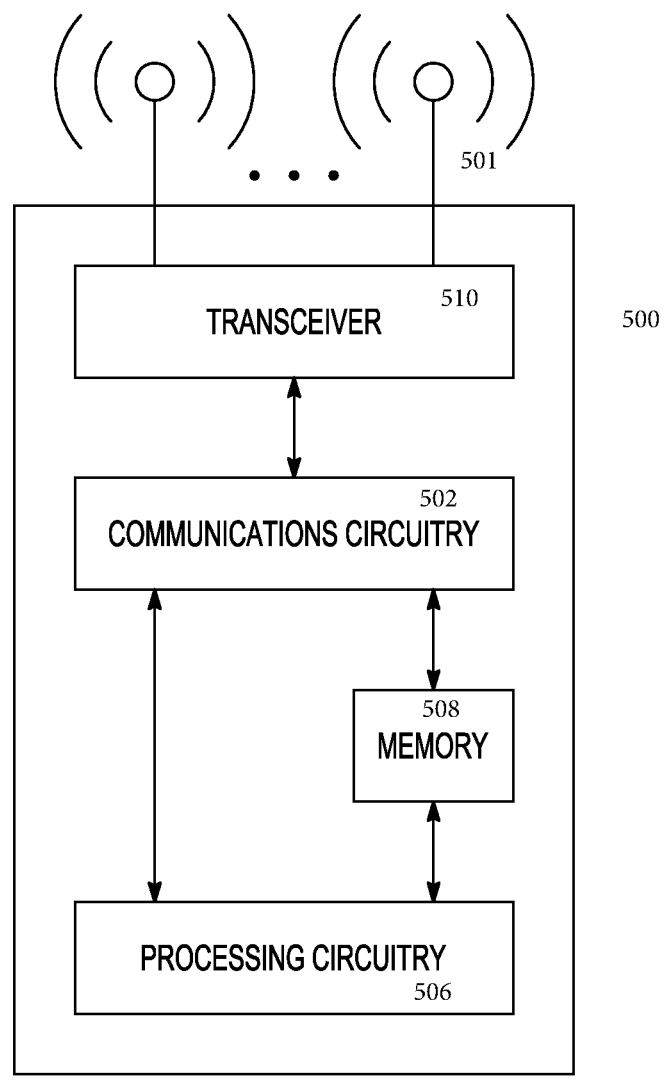
FIG. 5 is a functional block diagram of a wireless communication device, in accordance with some embodiments.

FIG. 5 illustrates a functional block diagram of a wireless communication device, in accordance with some embodiments. Wireless communication device 500 may be suitable for use as a UE or gNB configured for operation in a 5G NR network. The communication device 500 may include communications circuitry 502 and a transceiver 510 for transmitting and receiving signals to and from other communication devices using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication device 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication device 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 500 may include one or more of a keyboard, a display, a non-volatile memory port, multiple antennas, a graphics processor, an application processor, speakers, and other mobile device elements. The display may be an LCD screen including a touch screen.

Although the communication device 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 500 may refer to one or more processes operating on one or more processing elements.

EXAMPLES

Example 1 may include a method of wireless communication to schedule one or multiple PDSCHs or PUSCHs by a DCI for multi-TTI scheduling.

Example 2 may include the method of example 1 or some other example herein, wherein for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH.

Example 3 may include the method of example 1 or some other example herein, wherein for any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH.

Example 4 may include the method of example 2 or some other example herein, wherein if the two PDCCHs end in the same symbol, the UE is not expected that, a first PDSCH, that is scheduled with the second PDCCH, starts earlier than the end of the last PDSCH that is scheduled by the first PDCCH, if a first PDSCH, that is scheduled with the first PDCCH, starts earlier than the end of the last PDSCH that is scheduled by the second PDCCH.

Example 5 may include the method of example 3 or some other example herein, wherein if the two PDCCHs end in the same symbol, the UE is not expected that, a first PUSCH, that is scheduled with the second PDCCH, starts earlier than the end of the last PUSCH that is scheduled by the first PDCCH, if a first PUSCH, that is scheduled with the first PDCCH, starts earlier than the end of the last PUSCH that is scheduled by the second PDCCH.

Example 6 may include the method of example 2 or some other example herein, wherein in a given scheduled cell, UE is not expected to be scheduled to receive more than one unicast PDSCH in a slot.

Example 7 may include the method of example 3 or some other example herein, wherein in a given scheduled cell, UE is not expected to be scheduled to receive more than one unicast PUSCH in a slot.

Example 8 may include the method of example 1 or some other example herein, wherein for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the first PDSCH that is scheduled by the first PDCCH.

Example 9 may include the method of example 1 or some other example herein, wherein for any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the first PUSCH that is scheduled by the first PDCCH.

Example 10 may include a method comprising: determining one or more scheduling restrictions for scheduling of wireless communication to schedule one or multiple PDSCHs or PUSCHs by a DCI in a PDCCH for multi-TTI scheduling; and encoding the DCI for transmission to a UE to schedule the one or more PDSCHs or PUSCHs based on the one or more scheduling restrictions.

Example 11 may include the method of example 10 or some other example herein, wherein the one or more scheduling restrictions include that for any two or more HARQ process IDs in a given scheduled cell, if one or multiple PDSCHs are scheduled by a first PDCCH ending in symbol i, the UE is not expected that, a first PDSCH, that is scheduled with a second PDCCH that ends later than symbol i, starts earlier than the end of the last PDSCH that is scheduled by the first PDCCH.

Example 12 may include the method of example 10-11 or some other example herein, wherein the one or more scheduling restrictions include that for any two or more HARQ process IDs in a given scheduled cell, if one or multiple PUSCHs are scheduled by a first PDCCH ending in symbol i, the UE is not expected that, a first PUSCH, that is scheduled with a second PDCCH that ends later than symbol i, starts earlier than the end of the last PUSCH that is scheduled by the first PDCCH.

Example 13 may include the method of example 10-12 or some other example herein, wherein the one or more scheduling restrictions include that if the two PDCCHs end in the same symbol, the UE is not expected that, a first PDSCH, that is scheduled with the second PDCCH, starts earlier than the end of the last PDSCH that is scheduled by the first PDCCH, if a first PDSCH, that is scheduled with the first PDCCH, starts earlier than the end of the last PDSCH that is scheduled by the second PDCCH.

Example 14 may include the method of example 10-13 or some other example herein, wherein the one or more scheduling restrictions include that if the two PDCCHs end in the same symbol, the UE is not expected that, a first PUSCH, that is scheduled with the second PDCCH, starts earlier than the end of the last PUSCH that is scheduled by the first PDCCH, if a first PUSCH, that is scheduled with the first PDCCH, starts earlier than the end of the last PUSCH that is scheduled by the second PDCCH.

Example 15 may include the method of example 10-14 or some other example herein, wherein that one or more scheduling restrictions include that in a given scheduled cell, UE is not expected to be scheduled to receive more than one unicast PDSCH in a slot.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G NR) system, the apparatus comprising processing circuitry; and memory, the processing circuitry configured to:
    decode radio-resource configuration (RRC) signalling to configure the UE with a time-domain resource allocation list for scheduling multiple physical downlink shared channels (PDSCHs) (MultiPDSCH) by a first downlink control information (DCI);
    decode RRC signalling to configure the UE with a time domain resource assignment for a PDSCH scheduled by a second DCI;

decode the first DCI and the second DCI, the first DCI scheduling the multiple PDSCHs in a serving cell in accordance with the time-domain resource allocation list for MultiPDSCH, the second DCI scheduling the PDSCH in the serving cell in accordance with the time domain resource assignment;

wherein each of the multiple PDSCHs scheduled by the first DCI is signaled by a separate start and length indicator value (SLIV) in one or more rows of the time-domain resource allocation list, wherein when the first DCI and the second DCI end at a same symbol and one or more rows of the time-domain resource allocation list contain multiple SLIVs, the multiple PDSCHs scheduled by the first DCI and the PDSCH scheduled by the second DCI are expected to be in non-overlapping spans and the processing circuitry is configured to:

decode the multiple PDSCHs scheduled by the first DCI and the PDSCH scheduled by the second DCI in the non-overlapping spans, and wherein the memory is configured to store the first and second DCIs.

2. The apparatus of claim 1, wherein the processing circuitry is further configured to:

generate hybrid automatic repeat request (HARQ) acknowledge ACK (HARQ-ACK) feedback for each of the multiple PDSCHs scheduled by the first DCI and the PDSCH scheduled by the second DCI; and determine an uplink slot for transmission of the HARQ-ACK feedback based on an ending slot index of the first DCI.

3. The apparatus of claim 2, wherein the uplink slot for transmission of the HARQ-ACK feedback that is based on the ending slot index for the first DCI includes HARQ-ACK feedback for each of the multiple PDSCHs scheduled by the first DCI and HARQ-ACK feedback for the PDSCH scheduled by the second DCI when the first and second DCI end at the same symbol.

4. The apparatus of claim 3, wherein when the first DCI and the second DCI do not end at the same symbol and when the multiple PDSCHs scheduled by the first DCI and the PDSCH scheduled by the second DCI are scheduled in an overlapping span, the processing circuitry is configured to:

decode each of the multiple PDSCHs scheduled by the first DCI and the PDSCH scheduled by the second DCI; and generate HARQ-ACK feedback for the multiple PDSCHs scheduled by the first DCI and HARQ-ACK feedback for the PDSCH scheduled by the second DCI.

5. The apparatus of claim 4, wherein the processing circuitry is configured to:

determine a first uplink slot for transmission of the HARQ-ACK feedback for the multiple PDSCHs scheduled by the first DCI based on the ending slot index of the first DCI; and determine a second uplink slot for transmission of the HARQ-ACK feedback for the PDSCH scheduled by the second DCI based on the ending slot index of the slot DCI.

6. The apparatus of claim 5, wherein each of the multiple PDSCHs are associated with a different HARQ process identifier (ID) for the serving cell.

7. The apparatus of claim 1, wherein the processing circuitry is configured to use the time domain resource allocation list to determine a location of the multiple PDSCHs scheduled by the first DCI.

8. The apparatus of claim 7, wherein when the first DCI and the second DCI end at the same symbol, the processing circuitry is configured to check timing relations of the scheduled PDSCHs for validity by determining whether the multiple PDSCHs scheduled by the first DCI and the PDSCH scheduled by the second DCI have overlapping time spans.

9. The apparatus of claim 8, wherein when the first DCI and the second DCI do not end at the same symbol, the processing circuitry is configured to refrain from checking the timing relations of the scheduled PDSCHs for validity.

10. The apparatus of claim 9, wherein when the multiple PDSCHs scheduled by the first DCI and the PDSCH scheduled by the second DCI are determined to have overlapping time spans, the processing circuitry is configured to identify the multiple PDSCHs scheduled by the first DCI and the PDSCH scheduled by the second DCI as invalid and is to refrain from decoding the multiple PDSCHs scheduled by the first DCI and the PDSCH scheduled by the second DCI.

11. A non-transitory computer-readable storage medium that stores instructions for execution by processing circuitry of a user equipment (UE) configured for operation in a fifth-generation new radio (5G NR) system, wherein when the UE is configured for multi physical downlink shared channel (PDSCH) scheduling, the processing circuitry configured to:

decode radio-resource configuration (RRC) signalling to configure the UE with a time-domain resource allocation list for scheduling multiple physical downlink shared channels (PDSCHs) (MultiPDSCH) by a first downlink control information (DCI);

decode RRC signalling to configure the UE with a time domain resource assignment for a PDSCH scheduled by a second DCI;

decode the first DCI and the second DCI, the first DCI scheduling the multiple PDSCHs in a serving cell in accordance with the time-domain resource allocation list for MultiPDSCH, the second DCI scheduling the PDSCH in the serving cell in accordance with the time domain resource assignment;

wherein each of the multiple PDSCHs scheduled by the first DCI is signaled by a separate start and length indicator value (SLIV) in one or more rows of the time-domain resource allocation list, wherein when the first DCI and the second DCI end at a same symbol and one or more rows of the time-domain resource allocation list contain multiple SLIVs, the multiple PDSCHs scheduled by the first DCI and the PDSCH scheduled by the second DCI are expected to be in non-overlapping spans and the processing circuitry is configured to:

decode the multiple PDSCHs scheduled by the first DCI and the PDSCH scheduled by the second DCI in the non-overlapping spans.

12. The non-transitory computer-readable storage medium of claim 11, wherein the processing circuitry is further configured to:

generate hybrid automatic repeat request (HARQ) acknowledge ACK (HARQ-ACK) feedback for each of the multiple PDSCHs scheduled by the first DCI and the PDSCH scheduled by the second DCI; and determine an uplink slot for transmission of the HARQ-ACK feedback based on an ending slot index of the first DCI.

13. The non-transitory computer-readable storage medium of claim 12, wherein the uplink slot for transmission of the HARQ-ACK feedback that is based on the ending slot index for the first DCI includes HARQ-ACK feedback for each of the multiple PDSCHs scheduled by the first DCI and HARQ-ACK feedback for the PDSCH scheduled by the second DCI when the first and second DCI end at the same symbol.

14. The non-transitory computer-readable storage medium of claim 13, wherein when the first DCI and the second DCI do not end at the same symbol and when the multiple PDSCHs scheduled by the first DCI and the PDSCH scheduled by the second DCI are scheduled in an overlapping span, the processing circuitry is configured to:
  decode each of the multiple PDSCHs scheduled by the first DCI and the PDSCH scheduled by the second DCI; and
  generate HARQ-ACK feedback for the multiple PDSCHs scheduled by the first DCI and HARQ-ACK feedback for the PDSCH scheduled by the second DCI.

15. The non-transitory computer-readable storage medium of claim 14, wherein the processing circuitry is configured to:
  determine a first uplink slot for transmission of the HARQ-ACK feedback for the multiple PDSCHs scheduled by the first DCI based on the ending slot index of the first DCI; and
  determine a second uplink slot for transmission of the HARQ-ACK feedback for the PDSCH scheduled by the second DCI based on the ending slot index of the slot DCI.

16. The non-transitory computer-readable storage medium of claim 15, wherein each of the multiple PDSCHs are associated with a different HARQ process identifier (ID) for the serving cell.

17. The non-transitory computer-readable storage medium of claim 11, wherein the processing circuitry is configured to use the time domain resource allocation list to determine a location of the multiple PDSCHs scheduled by the first DCI.

18. The non-transitory computer-readable storage medium of claim 17, wherein when the first DCI and the second DCI end at the same symbol, the processing circuitry is configured to check timing relations of the scheduled PDSCHs for validity by determining whether the multiple PDSCHs scheduled by the first DCI and the PDSCH scheduled by the second DCI have overlapping time spans.

19. An apparatus of a gNodeB (gNB) configured for operation in a fifth-generation new radio (5G NR) system, the apparatus comprising processing circuitry; and memory, wherein for a user equipment (UE) configured for multi physical downlink shared channel (PDSCH) scheduling, the processing circuitry configured to:
  encode radio-resource configuration (RRC) signalling for transmission to configure the UE with a time-domain resource allocation list for scheduling multiple physical downlink shared channels (PDSCHs) (MultiPDSCH) by a first downlink control information (DCI);
  encode RRC signalling for transmission to configure the UE with a time domain resource assignment for a PDSCH scheduled by a second DCI;
  encode the first DCI and the second DCI for transmission to the UE, the first DCI scheduling the multiple PDSCHs in a serving cell in accordance with the time-domain resource allocation list for MultiPDSCH, the second DCI scheduling the PDSCH in the serving cell in accordance with the time domain resource assignment;
  wherein each of the multiple PDSCHs scheduled by the first DCI is signaled by a separate start and length indicator value (SLIV) in one or more rows of the time-domain resource allocation list,
  wherein when the first DCI and the second DCI end at a same symbol and one or more rows of the time-domain resource allocation list contain multiple SLIVs, the multiple PDSCHs scheduled by the first DCI and the PDSCH scheduled by the second DCI are expected to be in non-overlapping spans and the processing circuitry is configured to:
  encode the multiple PDSCHs scheduled by the first DCI and the PDSCH scheduled by the second DCI in the non-overlapping spans for transmission to the UE, and
  wherein the memory is configured to store the first and second DCIs.

20. The apparatus of claim 19, wherein the processing circuitry is further configured to:
  determine an uplink slot for reception of hybrid automatic repeat request (HARQ) acknowledge ACK (HARQ-ACK) feedback based on an ending slot index of the first DCI, the HARQ-ACK feedback for each of the multiple PDSCHs scheduled by the first DCI and the PDSCH scheduled by the second DCI; and
  decode the HARQ-ACK feedback received from the UE.

* * * * *